US012528318B2

(12) United States Patent
Gaxiola Cockburn et al.

(10) Patent No.: US 12,528,318 B2
(45) Date of Patent: Jan. 20, 2026

(54) COMPACT ROTARY UNION ASSEMBLY FOR A WHEEL HUB (71) Applicant: Deere & Company, Moline, IL (US)

(72) Inventors: Rafael Gaxiola Cockburn, Nuevo León (MX); Mark D. Klein, Ankeny, IA (US); John R. Vande Kemp, Cambridge, IL (US); Eric A. Keen, Manhattan, KS (US)

(73) Assignee: Deere & Company, Moline, IL (US)

( * ) Notice: Subject to any disclaimer, the term of this patent is extended or adjusted under 35 U.S.C. 154(b) by 356 days.

(21) Appl. No.: 18/132,066

(22) Filed: Apr. 7, 2023

(65) Prior Publication Data
US 2023/0382164 A1 Nov. 30, 2023

Related U.S. Application Data (60) Provisional application No. 63/346,570, filed on May 27, 2022.

(51) Int. Cl.
*B60C 23/10* (2006.01)
*B60C 23/00* (2006.01)

(52) U.S. Cl.
CPC .. *B60C 23/00318* (2020.05); *B60C 23/00345* (2020.05); *B60C 23/00363* (2020.05); *B60C 2200/08* (2013.01)

(58) Field of Classification Search
CPC ......... B60C 29/00; B60C 29/02; B60C 29/04; B60C 29/06; B60C 23/00363; B60C 23/10; B60C 23/127
See application file for complete search history.

(56) References Cited

U.S. PATENT DOCUMENTS

| 6,105,645 A | 8/2000 | Ingram |
| 6,244,316 B1 | 6/2001 | Naedler |
| 6,325,124 B1 | 12/2001 | Colussi et al. |
| 6,575,269 B1 | 6/2003 | Skoff et al. |

(Continued)

FOREIGN PATENT DOCUMENTS

| CA | 2945636 A1 | 4/2017 |
| DE | 3535855 A1 | 4/1987 |

(Continued)

OTHER PUBLICATIONS

German Search Report issued in application No. 102023110875.1, dated Oct. 27, 2023, 4 pages.

*Primary Examiner* — Justin R Fischer
(74) *Attorney, Agent, or Firm* — Taft Stettinius & Hollister LLP; Stephen F. Rost (57) ABSTRACT

A compact rotary union assembly for inflating and deflating a tire mounted to a hub having a hub housing. The compact rotary union assembly includes a spindle, an inner sleeve, and an outer sleeve. The spindle includes a spindle channel. The inner sleeve includes a flange portion, a cylinder portion coupled to the flange portion, a bore extending through the flange portion and the cylinder portion, and an inner sleeve channel located within the flange portion and the cylinder portion. The inner sleeve channel is coupled to a first port and to the spindle channel. An outer sleeve includes an outer sleeve channel, coupled to the spindle channel and to a second port, wherein the cylinder portion is located within an outer sleeve bore of the outer sleeve. A first and a second air seal are located within the outer sleeve on either side of an air track.

20 Claims, 11 Drawing Sheets (56) References Cited

U.S. PATENT DOCUMENTS

| | | |
|---|---|---|
| 6,857,457 B2 | 2/2005 | Nienhaus |
| 7,207,365 B2 | 4/2007 | Nelson et al. |
| 7,963,159 B2 | 6/2011 | Ingram et al. |
| 7,997,316 B2 | 8/2011 | Walter et al. |
| 8,783,314 B2 | 7/2014 | Tigges |
| 9,248,705 B2 | 2/2016 | Brenninger et al. |
| 9,409,449 B2 | 8/2016 | Cis et al. |
| 9,446,637 B2 | 9/2016 | Knapke et al. |
| 10,059,156 B2 | 8/2018 | Knapke et al. |
| 10,556,469 B2 | 2/2020 | Foor et al. |
| 10,562,357 B2 | 2/2020 | Burke et al. |
| 10,661,612 B2 | 5/2020 | Linzbach |
| 11,117,426 B1 | 9/2021 | Tigges |
| 11,226,040 B2 | 1/2022 | Bill et al. |
| 2009/0211682 A1 | 8/2009 | Sobotzik |
| 2014/0062031 A1 | 3/2014 | Honzek et al. |
| 2014/0363271 A1 | 12/2014 | Wagemann et al. |
| 2015/0136291 A1 | 5/2015 | Grimm et al. |
| 2017/0122435 A1 | 5/2017 | Molina et al. |

FOREIGN PATENT DOCUMENTS

| | | |
|---|---|---|
| DE | 102004021161 A1 | 11/2005 |
| DE | 102005006073 A1 | 8/2006 |
| DE | 202011051737 U1 | 11/2011 |
| DE | 102011004901 A1 | 9/2012 |
| DE | 202015105702 U1 | 1/2017 |
| DE | 102017211574 A1 | 1/2019 |
| DE | 102017223349 A1 | 6/2019 |
| EP | 2072290 B1 | 4/2012 |
| EP | 2842769 A1 | 3/2015 |
| EP | 2655101 B1 | 9/2015 |
| EP | 3341225 B1 | 12/2018 |
| JP | S63199932 A | 8/1988 |
| WO | 2007109818 A1 | 10/2007 |
| WO | 2017076850 A1 | 5/2017 |

COMPACT ROTARY UNION ASSEMBLY FOR A WHEEL HUB

RELATED APPLICATIONS

The present application claims the benefit of U.S. Provisional Patent Application Ser. No. 63/346,570, filed May 27, 2022, and entitled "COMPACT ROTARY UNION ASSEMBLY FOR A WHEEL HUB" the disclosure of which is hereby incorporated by reference in its entirety.

FIELD OF THE DISCLOSURE

The present disclosure relates to a tire inflation system, and in particular, to a tire inflation system for an agricultural row planter.

BACKGROUND

An agricultural row planter deposits seeds in rows formed by individual row units attached to a frame. In some row planters, the planter includes a fertilizer row spreader, that deposits fertilizer in rows to prepare the ground for depositing the seeds in the soil. In many implementations, agricultural row planters are capable of depositing fertilizer at the same time as seeding. In these types of agricultural equipment, the fertilizer spreader precedes the row crop planter such that the ground in which the seeds are deposited has been also been fertilized.

The agricultural row planter is typically pulled by a tractor, or other agricultural work vehicle, and includes a plurality of planter row units that are aligned side by side to form, on a common frame, a multi-row seed planter. In an agricultural apparatus configured to fertilize and deposit seeds at the same time, the fertilizer row units and seeding row units of the apparatus are aligned substantially parallel to the travel direction of the tractor when being pulled through a field.

In some row planters, the plurality of row units is arranged on a common frame that includes a first end section or a first end section and a second end section of the frame, wherein the section or sections, are folded with respect to a central section of the frame for transportation. Each of the end sections and the middle section are supported by wheel assemblies that support the entire frame while the spreader is pulled through a field. In this configuration, the pressure of the tires of wheels assemblies have a reduced pressure to prevent the tires from excessively compacting the soil. When moving from one field to the next, however, a lateral length of the common frame, with respect to a towing direction, is often too long since the width of the road being traveled is less than the lateral length of the entire frame. To enable movement of the planter, the end section or end sections are folded to a raised position with respect to the central section for transportation. In such a configuration, however, the weight of the folded fertilizer planter is concentrated on the wheel assemblies of the central section, instead of the weight being spread along all wheel assemblies of each section. For road travel, the pressure of the tires supporting the central section is increased to provide a suitable tire pressure. Once the planter is returned to the field, the tire pressure of the central section is reduced for field use.

As with all mechanical systems, and especially for those types of systems used in the agricultural setting, the hub assembly supporting the tire wears out through use and requires either repair or replacement. Such hub assemblies, however, include large and costly components with complicated drill passages that deliver airflow to deflate and inflate the tire. These components are difficult to service and often require extensive labor for repair or replacement of the hub assembly. As a result, aftermarket solutions are known but can be difficult to install.

SUMMARY

What is needed therefore is a hub assembly having improved serviceability and packaging. In addition, a hub assembly that reduces or eliminates the use of O-rings and which reduces the time and expense of repairing or replacing the hub assembly or a subcomponent of the hub assembly is also needed.

In one implementation, there is provided a compact rotary union assembly for inflating a tire mounted to a hub having a hub housing. The compact rotary union assembly includes an inner sleeve having a flange portion, a cylinder portion coupled to the flange portion, a bore extending through the flange portion and the cylinder portion, and a channel coupled to a first port, with the channel extending through the inner sleeve. The channel includes a first channel section extending through the flange portion and substantially parallel to a first planar surface of the flange portion, and a second channel section, coupled to the first channel section, the second channel section extending substantially parallel to the bore, wherein the second channel section is connected to the first channel section. An outer sleeve includes an outer sleeve bore and a second port, wherein the inner sleeve is located within the outer sleeve bore and the second port is coupled to the second channel section. A v-ring seal is located between the inner sleeve and the outer sleeve, wherein the v-ring seal seals an interface between the inner sleeve and the outer sleeve to substantially prevent dust or debris from entering the compact rotary union.

In some implementations, the compact rotary union assembly includes wherein the outer sleeve has a first air seal track spaced from a second air seal track to define an air track, wherein the air track is coupled to the second port and receives a flow of air from the second channel section.

In some implementations, the compact rotary union assembly includes wherein the outer sleeve has a track configured to receive a backing support, wherein the backing support is disposed in the track and is adjacent to the v-ring seal.

In some implementations, the compact rotary union assembly includes wherein a first air seal is located in the first air seal track and the backing support holds the v-ring seal at the inner sleeve and holds the first air seal in the first air seal track.

In some implementations, the compact rotary union assembly includes a second air seal disposed in the second air seal track.

In some implementations, the compact rotary union assembly includes wherein the outer sleeve has an oil seal circular track.

In some implementations, the compact rotary union assembly includes an oil seal and a step, wherein the step is located adjacently to the oil seal and the oil seal is located within the oil seal circular track.

In some implementations, the compact rotary union assembly includes wherein the bore defines a threaded surface along one or both of the flange portion and the cylinder portion, the threaded surface configured to engage a threaded surface of a spindle extending through the hub housing.

In some implementations, the compact rotary union assembly includes wherein the outer sleeve has an interference surface to engage an interference surface of the hub housing, wherein the outer sleeve engages the hub housing with an interference fit.

In some implementations, the compact rotary union assembly includes a first air seal, a second air seal, and an oil seal, wherein the first air seal is located on a first side of the second port within the outer sleeve and the second air seal is located on a second side of the second port within the outer sleeve, and wherein the oil seal is located adjacent to the first air seal to prevent grease leakage.

In some implementations, the compact rotary union assembly includes wherein the first air seal, the second air seal and the oil seal are free to rotate with respect to the inner sleeve.

In some implementations, the compact rotary union assembly includes a v-ring seal located between the second air seal and the flange portion, where the v-ring seal substantially excludes external contaminants from the entering the compact rotary union assembly.

In some implementations, the compact rotary union assembly provides a retrofittable modular assembly for insertion into the hub housing.

In another implementation, there is provided a method of assembling a retrofittable compact rotary union assembly for insertion into a hub housing of a wheel assembly for a work vehicle. The method includes: providing a compact rotary union inner sleeve having a flange portion and a cylinder portion, both of which define a bore and a channel extending from a first port located at the flange portion to an second port located at the cylinder portion; inserting the cylinder portion into a v-ring seal until the v-ring seal contacts the flange portion; providing a compact rotary union outer sleeve having an outer sleeve bore defining a first circular seal track and a second circular seal track spaced apart by a circular air track connected to a second port; inserting a first air seal in the first circular seal track; inserting a second air seal in the second circular seal track; inserting the cylinder portion into the outer sleeve bore; aligning the circular air track with the second port of the cylinder portion; and inserting an oil seal into an oil seal track of the outer sleeve.

In some implementations, the method includes wherein inserting the first air seal includes inserting the first air seal directly adjacent to one side of the circular air track.

In some implementations, the method includes wherein inserting the second air seal includes inserting the second air seal directly adjacent to another side of the circular air track.

In a further implementation, there is provided a hub assembly including a hub housing defining a cavity and a spindle extending through and supported within the hub housing with a first roller bearing and a second roller bearing, wherein the spindle includes a spindle channel. An inner sleeve includes a flange portion, a cylinder portion, coupled to the flange portion and coupled to the spindle. A bore extends through the flange portion and the cylinder portion. An inner sleeve channel is coupled to the spindle channel and to a first port. The channel extends through the inner sleeve. An outer sleeve includes an outer sleeve bore and a second port, wherein the inner sleeve is located within the outer sleeve bore and the second port is coupled to the spindle channel. A v-ring seal is located between the inner sleeve and the outer sleeve, wherein the v-ring seal seals an interface between the inner sleeve and the outer sleeve to substantially prevent dust or debris from entering the compact rotary union.

In some implementations, the hub assembly includes wherein the bore defines a threaded surface along one or both of the flange portion and the cylinder portion. The threaded surface is configured to engage a threaded surface of the spindle.

In some implementations, the hub assembly includes wherein the outer sleeve has an interference surface to engage an interference surface of the hub housing, wherein the outer sleeve engages the hub housing with an interference fit.

In some implementations, the hub assembly includes wherein the outer sleeve has a first air seal track spaced from a second air seal track to define an air track, wherein the air track is coupled to the second port and receives a flow of air from the second channel section.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
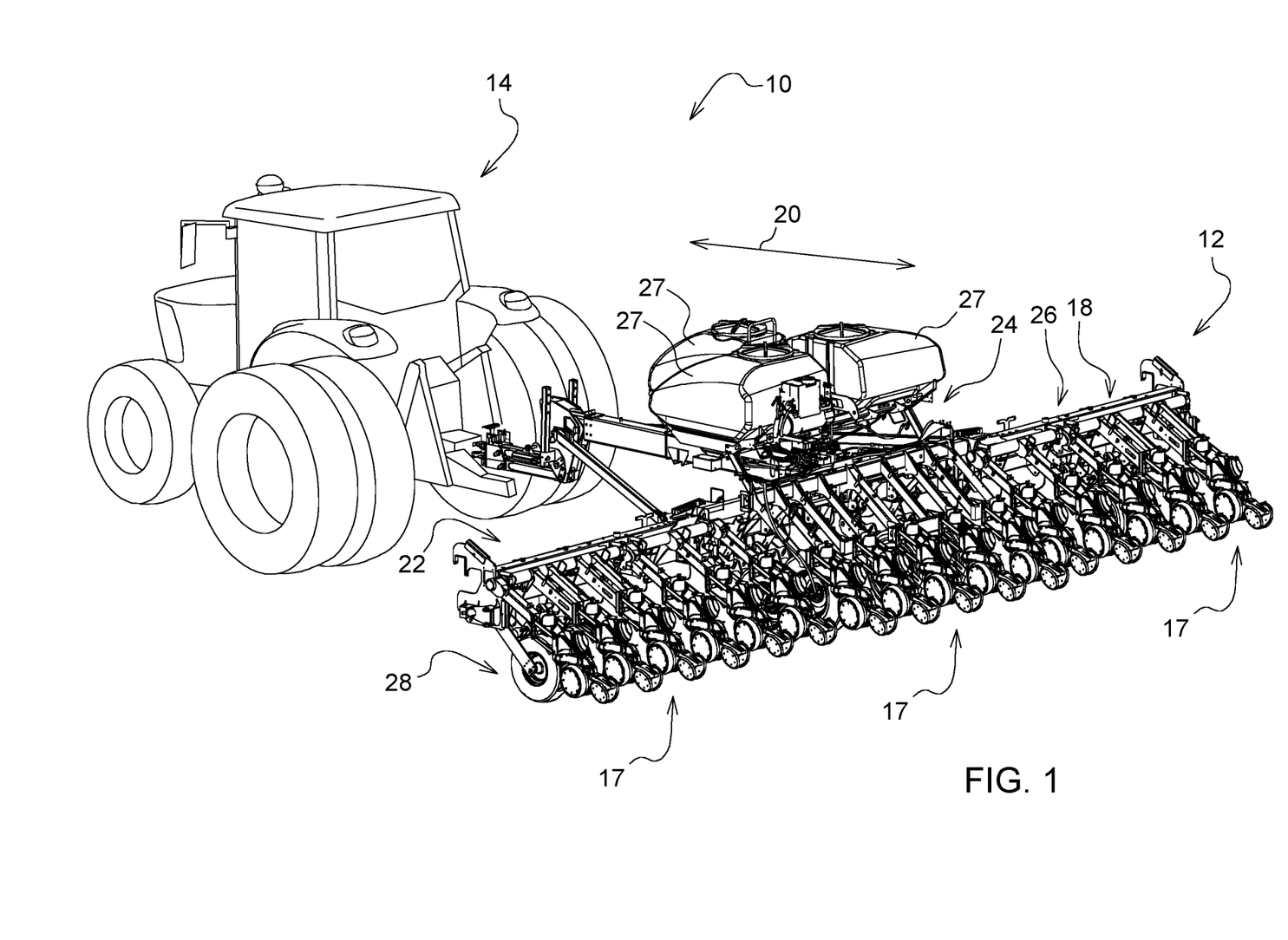
FIG. 1 is a perspective view of an agricultural system including a row crop planter pulled by a work vehicle.

Referring to the drawings, and more particularly to FIG. 1, there is shown an implementation of an agricultural system 10 including an agricultural implement 12. In the implementation shown, the agricultural implement 12 is a row fertilizer/planter, but in other implementations, the agricultural implement 12 is a row planter only. A work vehicle 14, in the form of a tractor, may be coupled to and moves the implement 12 with a suitable coupling arrangement 16, such as a draw bar or 3-point hitch arrangement. Other implementations are contemplated including an autonomous tractor pulling the implement 12, as well as an entirely self-contained autonomous fertilizer/planter in which the fertilizer/planter, or fertilizer planter, including the row units and a propulsion system, are a complete and unitary fertilizer/planter system.

The implement 12 may include a number of row units 17, with each row unit 17 being substantially identically configured, in at least one implementation. In different implementations, the row unit 17 is configured to cut a trench, apply fertilizer to the soil, and to deposit seeds of varying sizes in respective furrows in the soil for raising crops. Each of the row units 17 are coupled to common frame 18, which extends laterally to a towing direction 20. The common frame 18 includes a first end section 22, a central section 24, and a second end section 26.

As seen in FIG. 1, the row units 17 include a disk opener, that cuts a trench in which fertilizer is applied, a fertilizer applicator, and a seed deposit assembly. The implement 12 further includes one or more hoppers 27 each of which includes a cavity configured to hold fertilizers, nutrients, or seeds as understood by one skilled in the art. Each of the sections 22, 24, and 26 are supported by wheel assemblies 28, one of which is shown in FIG. 1. See also FIGS. 2 and 3.

Figure 2:
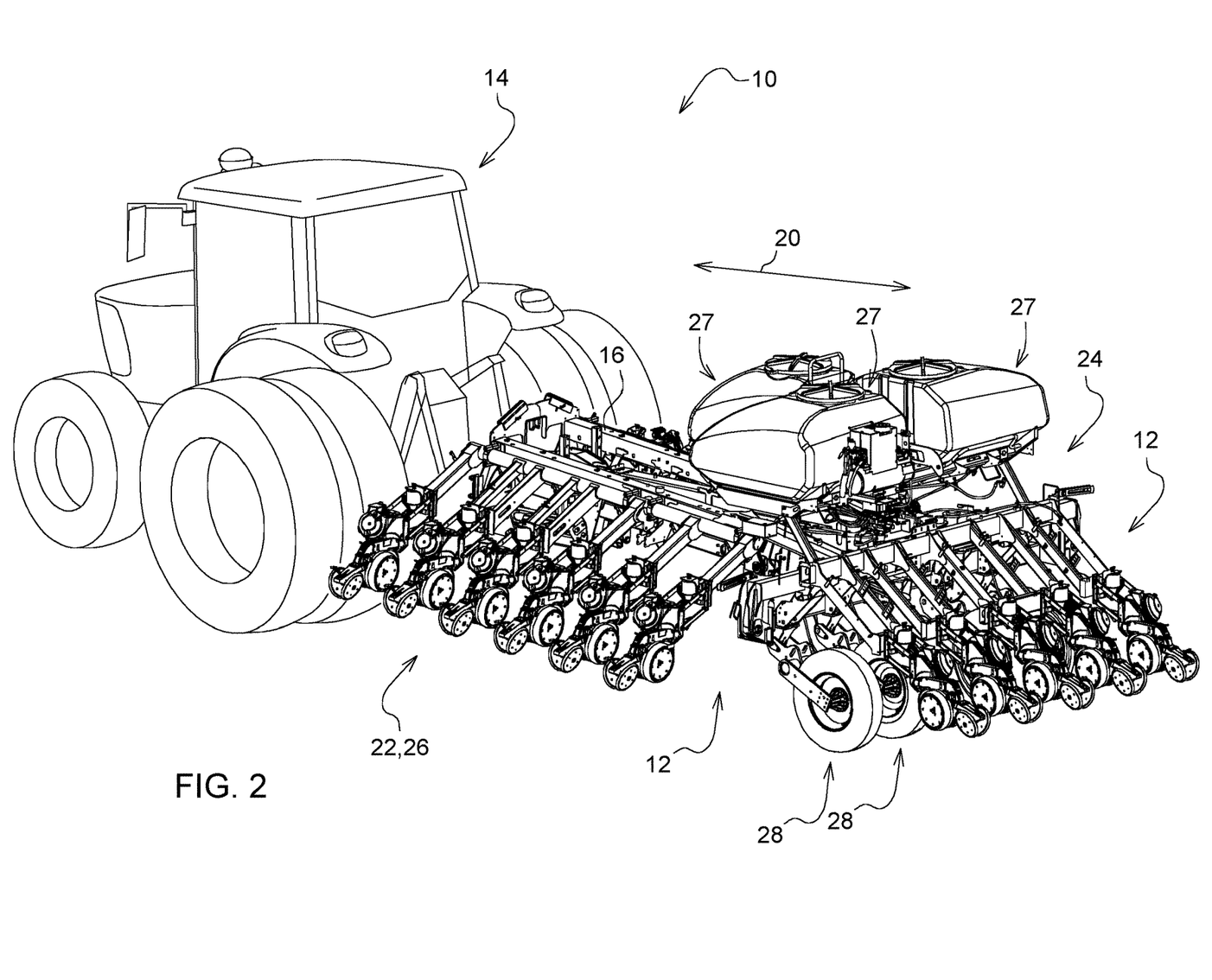
FIG. 2 is a perspective view of an agricultural system including a row crop planter pulled by a work vehicle configured for traveling a road.

FIG. 2 illustrates a left-side rear perspective view of the agricultural system 10 of FIG. 1 wherein the implement 12 is configured to be towed along a road from one field to the next or from one field to a storage facility. In this configuration, the first end section 22 and second end section 26 are moved to a towing configuration which reduces the lateral length of the implement 12 so that the entire width of the implement 12 fits within a road when being towed. In this configuration, wheel assemblies 28 of the central section 24 can be seen. Since the first end section 22 and second end section 26 have been moved to a towing position, the wheel assemblies of these sections are raised from the ground and no longer support these sections. Consequently, the planter wheel assemblies 28 are the only planter wheels supporting the weight of each of the sections 22, 24, and 26.

Figure 3:
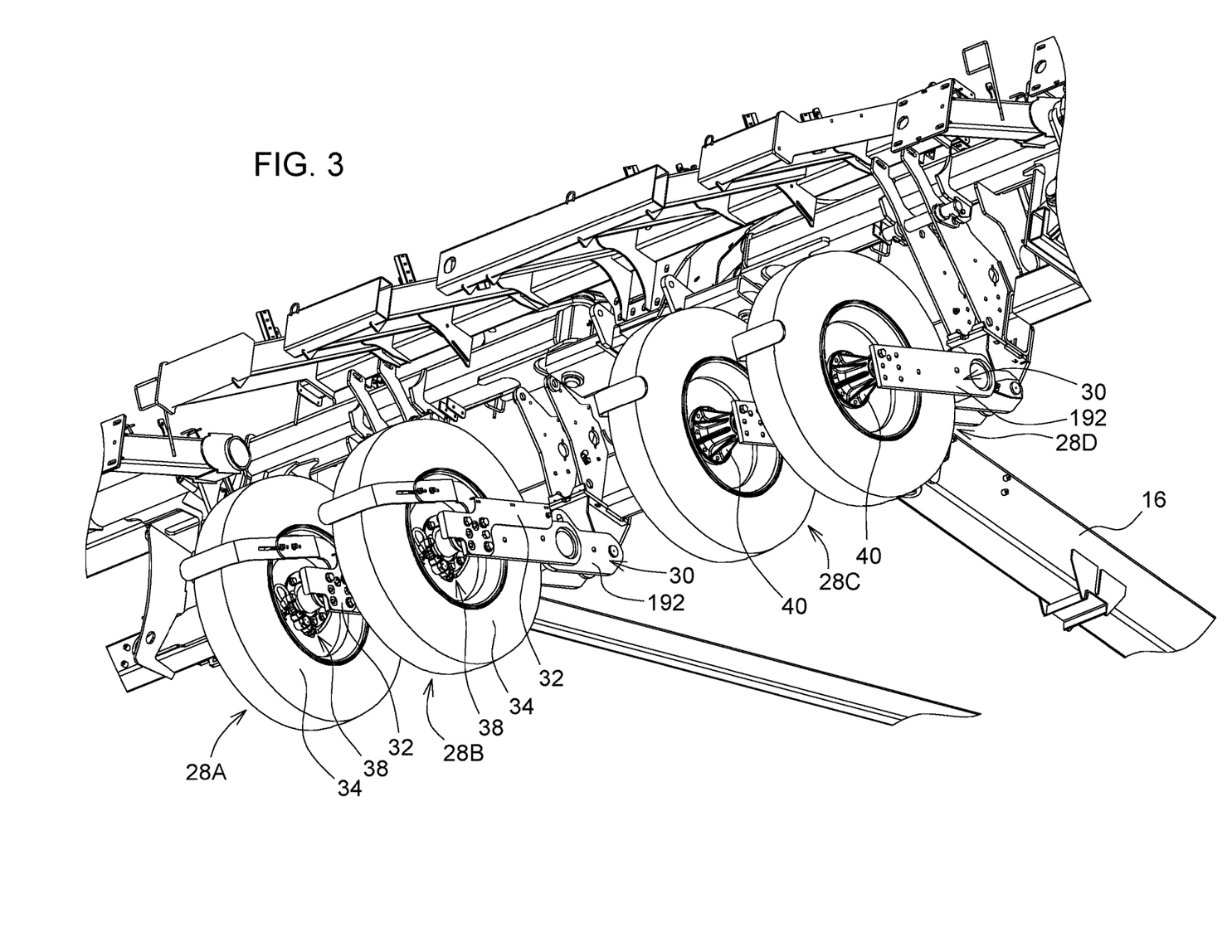
FIG. 3 is an underneath perspective view of central section of a single row crop planter.
Figure 4:
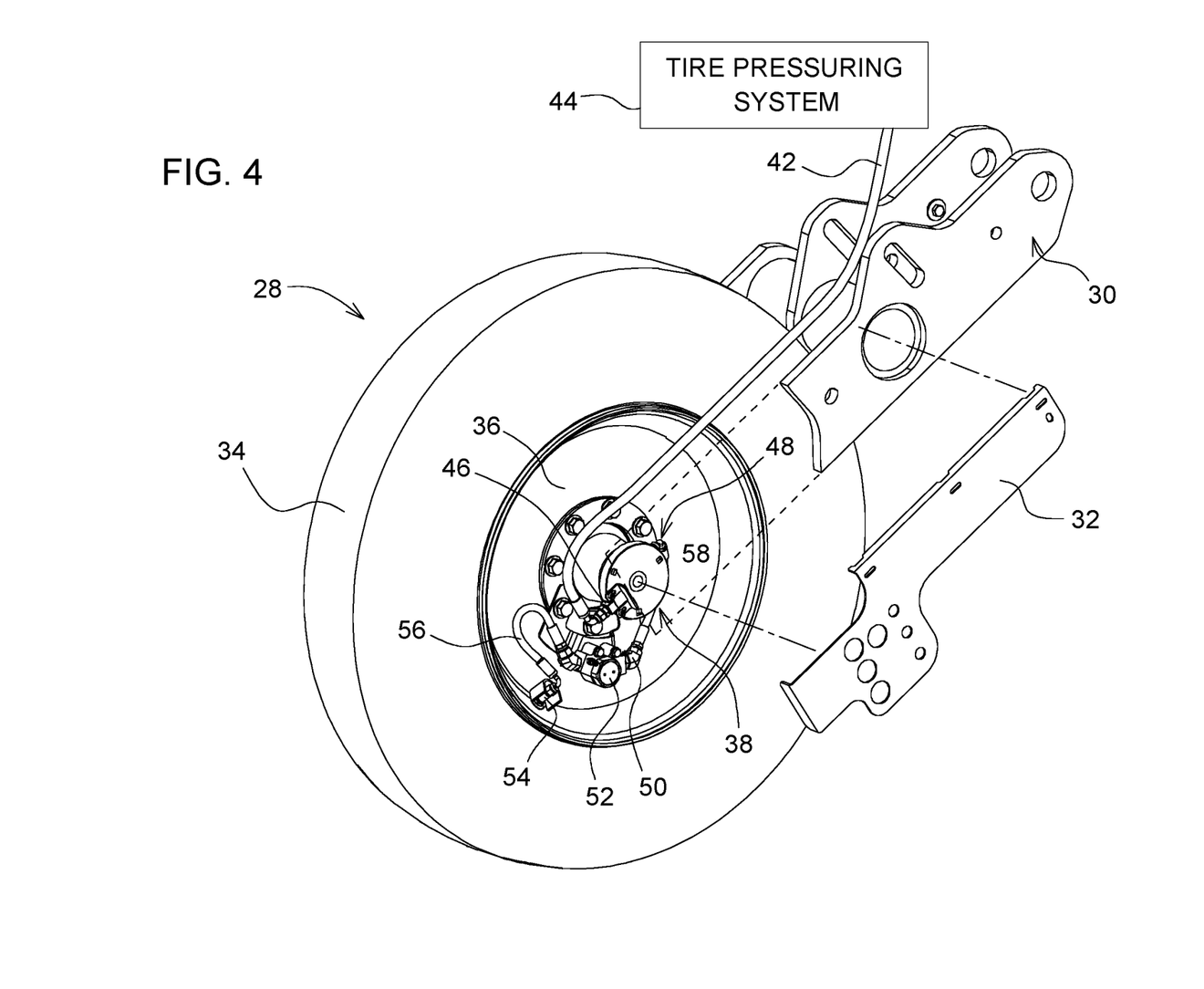
FIG. 4 is perspective view of a wheel assembly.

FIG. 3 illustrates an underneath perspective view of the central section 24 of implement 12 including four wheel assemblies 28. In this view, the row units 17 are removed to better illustrate the wheel assemblies 28. Each of the four wheel assemblies 28 is supported by a yoke 30 coupled to the wheel assembly 28, having a coverplate 32. The yoke 30 rotatably supports the wheel assembly 28. The wheel assembly 28 includes a tire 34 supported by a rim 36 that supports a compact rotary union assembly 38. The compact rotary union assembly 38 is located in a hub 40 and is part of a wheel hub assembly. The rotary union assembly 38 transfers pressurized air or nitrogen through a pipe 42 coupled to a central tire pressuring system 44 as seen in FIG. 4. The pressuring system 44 inflates and deflates each of the tires as is understood by one skilled in the art. While the compact rotary union hub assembly 38 is described with respect to the agricultural planter 12, the hub assembly 38 is not limited to use with a planter 12 and other applications of the hub assembly are contemplated, including for instance other forms of agricultural implements including tillage tools, such as disks and chisel plows, air seeding tools, and other trailed or non-self-propelled equipment. Further applications include, but are not limited to, self-propelled equipment such as tractors, construction equipment, forestry equipment, and road construction equipment.

Each of the wheel assemblies 28 of the central section 24 include the compact rotary union assembly 38 which is illustrated for wheel assemblies 28A and 28B, but which are not shown for wheel assemblies 28C and 28D due to being connected to yokes 30 in a reverse direction when compared to wheel assemblies 28A and 28B. While each of the wheel assemblies coupled the first end section 22 and the second end section 26 do not include the rotary union assembly 38, in other implementations one or more of the wheel assemblies 28 include the rotary union assembly 38.

FIG. 4 illustrates a wheel assembly 28 including the rim 36 supporting the tire 34 whose pressure is adjusted by the central tire pressuring system 44. The central tire pressuring system 44 includes a pneumatic control unit, not shown, coupled to a first air pipe 42 which couples pressurized air to the compact rotary union assembly 38. The pressurized air is coupled to a first port 46 of the compact rotary union assembly 38 that connects through the assembly 38 to a second port 48. A second air pipe 50 is connected to the second port 48 and another end of the second air pipe 50 is connected to a mechanical stem 52, which is in turn connected to a valve stem 54, through a third air pipe 56. The mechanical stem 52 includes a valve, as is understood by one skilled in art, to direct pressurized air into the valve stem 52 for inflating the tire 34 or to release air from the valve stem 54 for depressurizing the tire 34 as needed. The tire pressurizing system 44, depending on the state of the mechanical stem 52, directs pressurized air from the first port 46 to the second port 48 to inflate the tire 34 or directs air from the second port 48 to the first port 46 to release air from the tire 34. The cover plate 32 provides a cover to protect the various fittings located at the hub 36.

The wheel assembly 28 is supported for rotation by the yoke 30. A lock assembly 58 (see FIG. 6), which is part of the compact rotary union assembly 38, abuts an end of the yoke 30 to prevent rotation of a portion of the compact rotary union assembly 38 as the tire 34 rotates.

Figure 5:
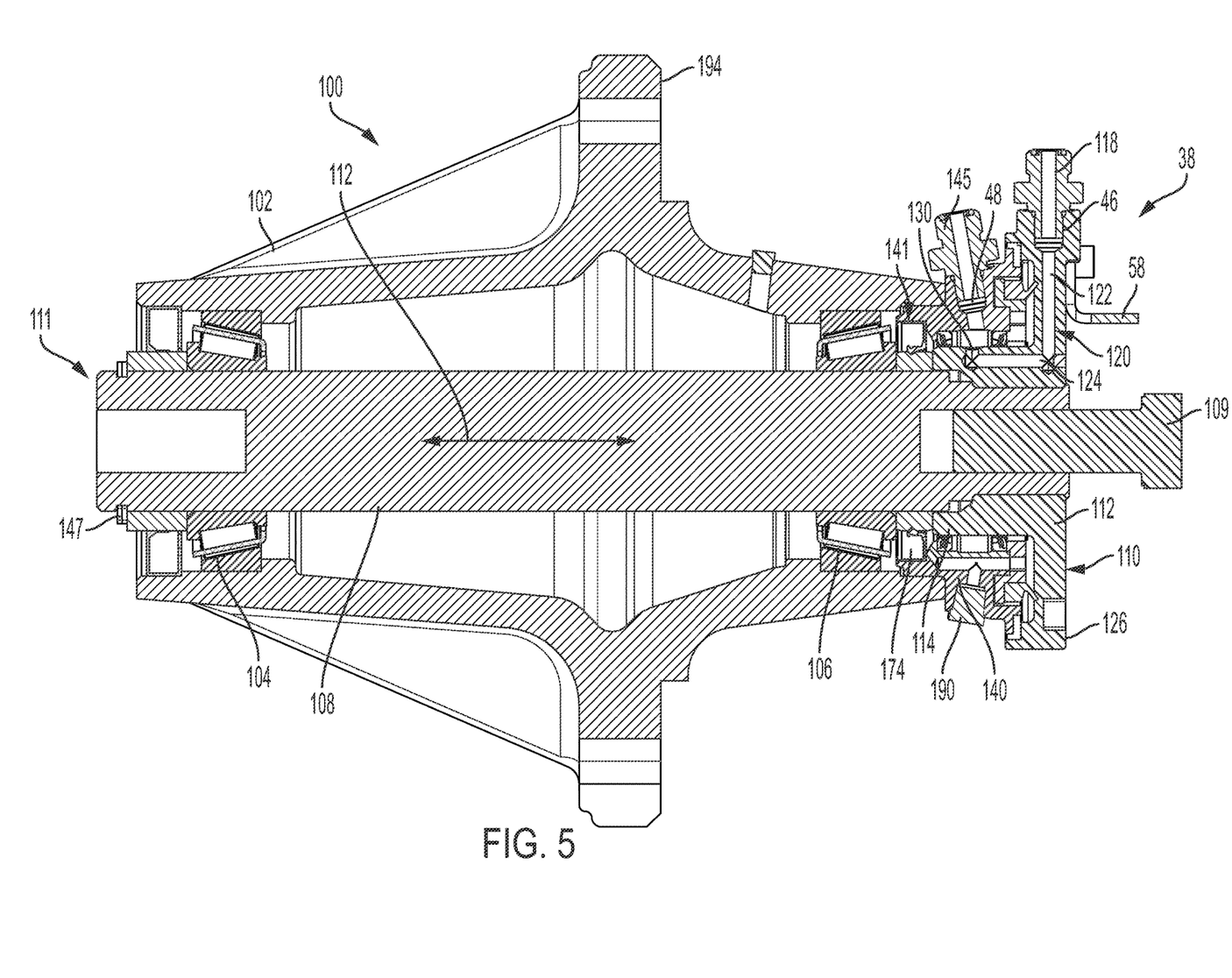
FIG. 5 illustrates a sectional view of a wheel hub assembly including a compact rotary union assembly.

FIG. 5 illustrates a sectional view of a wheel hub assembly 100 to which the compact rotary union assembly 38 is coupled. The hub assembly 100 includes a hub housing 102 defining an interior cavity supporting a first tapered roller bearing 104 and a second tapered roller bearing 106. Each of the bearings 104 and 106 rotatably supports a spindle 108, as is understood by one skilled in the art. The spindle 108 includes a screw 109 that extends along a longitudinal axis 112 of the spindle 108. The spindle 108 is coupled to the yoke 30 to enable rotation of the wheel assembly 28. A second screw, not shown, extends from the hub housing 102 at an end 111 of the spindle 108, which is coupled to the yoke 30.

Figure 6:
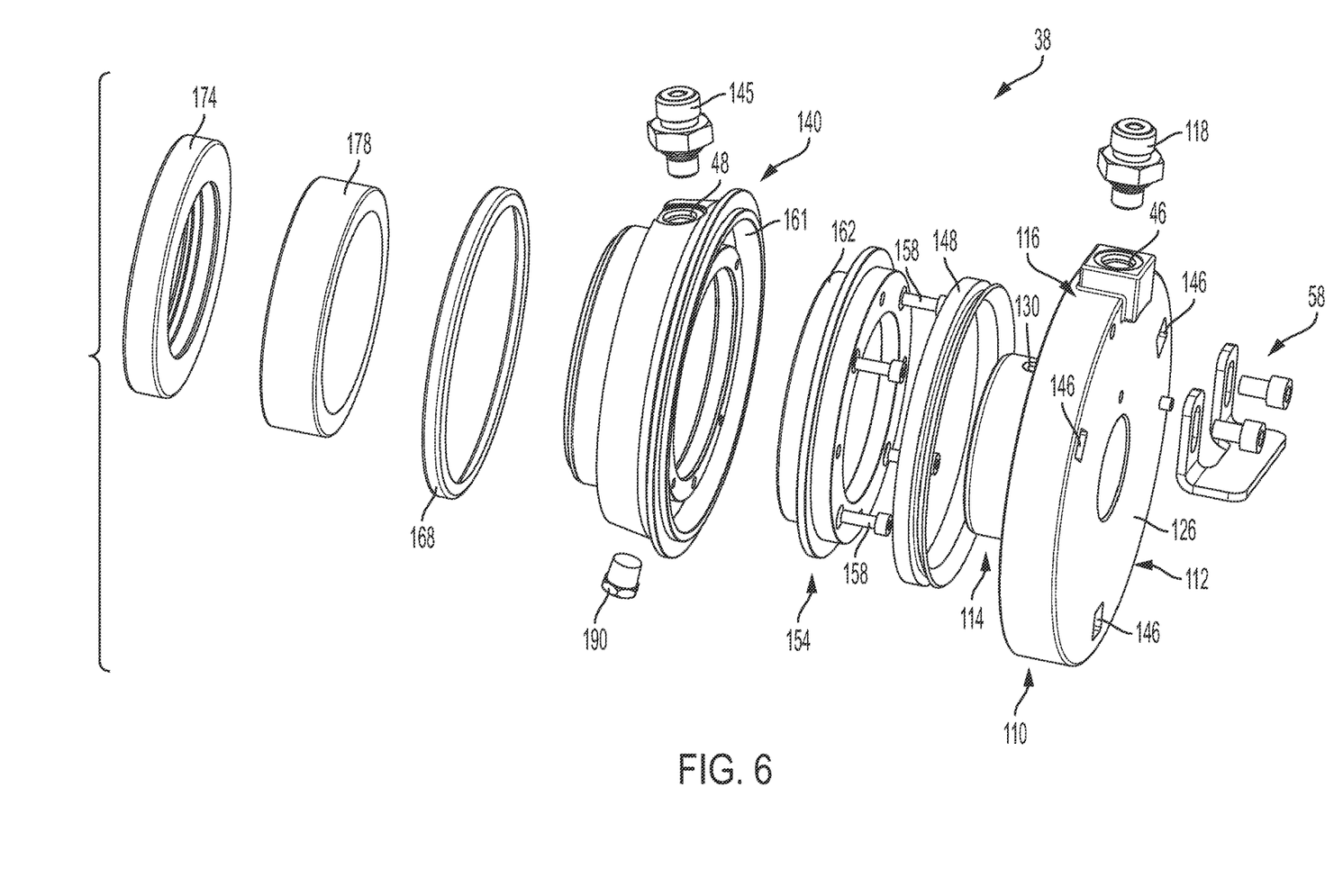
FIG. 6 illustrates a perspective exploded view of a compact rotary union assembly.
Figure 7:
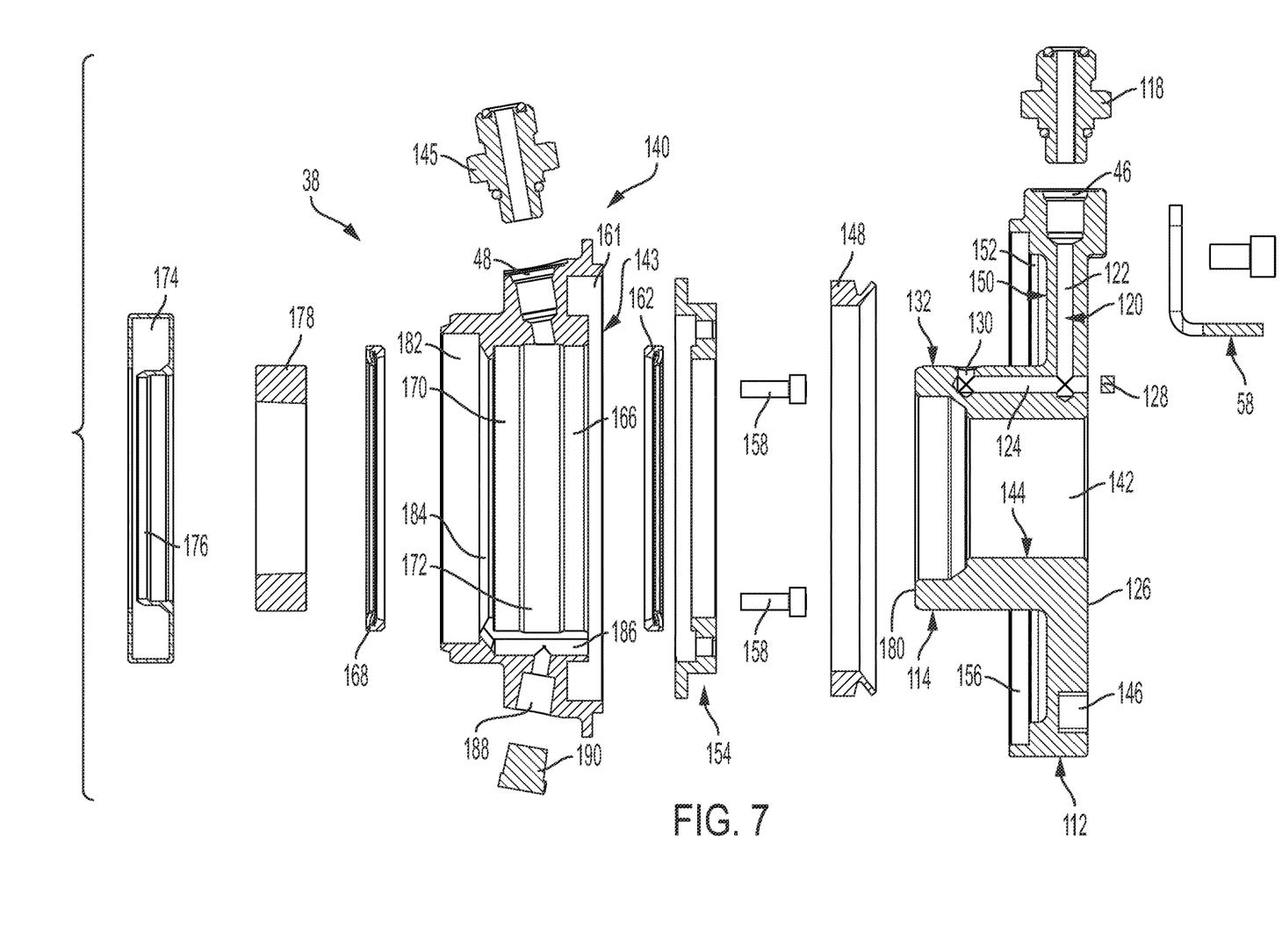
FIG. 7 illustrates a sectional exploded view of a compact rotary union assembly.

The compact rotary union assembly 38 is further illustrated in a perspective exploded view of FIG. 6 and a sectional view of FIG. 7. The union assembly 38 includes an inner sleeve 110 having a flange portion 112 and a cylinder portion 114 connected to the flange portion 112. The first port 46 is located at an outer circumference 116 of the flange portion 112 which is disk shaped. The outer circumference defines the first port 46. A first port connector 118 is configured to be received in the first port 46. The first air pipe 42 is connected to the first port connector 118 as seen in FIG. 4.

The first port 46, as seen in FIG. 7, is connected to a channel 120 that includes a first channel section 122 and a second channel section 124. The first channel section 122 generally extends along the flange portion 112 in parallel with a generally planar surface 126 of the flange portion 112. The second channel section 124 is coupled to and extends from the first channel section 122 within the cylinder portion 114. In one implementation, each of the first channel section 122 and the second channel section 124 are gun-drilled passages. The machined pattern helps to exclude dust and debris from reaching the inside of the union 38. Other methods of forming the passages are contemplated, such as by casting. An end of the second channel section 124 is closed with a plug 128. The second channel section 124 extends to a third channel 130 of a sidewall 132 of the cylinder portion 114. Airflow is directed between the first port 46 to the third channel 130 where it connects to the second port 48 of an outer sleeve 140. The outer sleeve 140 is pressed into the hub housing 102 by an interference fit between the sleeve 140 and housing 102 at adjacent surfaces 141 of FIG. 5. The outer circumference of the outer sleeve 140 includes a dimension to provide a desired interference fit with the hub housing 102 to hold outer sleeve 140 tightly in place. A second port connector 145 is connected to the second port 48.

The flange portion 112 and the cylinder portion 114 define a channel or bore 142 that extends substantially perpendicular to the planar surface 126. The outer sleeve 140 defines a channel or bore 143 configured to receive the cylinder portion 114 of the inner sleeve 110. The spindle 108 extends through the channel 142 as seen in FIG. 5. While not shown, an interior surface 144 of the channel 142 includes threads that engage threads of the spindle 108. A completed compact rotary union assembly 38 is held to the spindle 108 through threaded engagement of the two sets of threads. The flange portion 112 includes a plurality of recessed features 146 (see FIG. 6) configured to receive a tool used to tighten the inner sleeve 110 to the spindle 108. It has two controlled roughness surfaces where dynamic components contact to seal cavities and air flow.

The wheel hub assembly 10 of FIG. 5 includes a stop ring 147 located at end 111 of the spindle 108. The stop ring 147 substantially limits movement of the spindle 108 along the longitudinal axis 112. As the inner sleeve 110 is threaded to the spindle 108, the spindle 108 is pulled toward the inner sleeve 110. While the outer sleeve 140 and the hub housing 102 are interfaced at the surfaces 141, the outer sleeve 140 rotates, i.e., floats, with respect to the inner sleeve 110.

During assembly of the compact rotary union assembly 38 and prior to tightening the assembly 38, a v-ring 148 is located next to an interior surface 150 of the flange portion 112. The flange portion 112 includes a circumferential first shelf 152 that is configured to receive the v-ring 148, which provides a fluid and air seal between the v-ring 148 and the interior surface 150 and the first shelf 152. A backing support 154, configured as a circular band or ring supports v-ring seal 148 and fits over the cylinder portion 114 and into a circular track 156 located adjacently to the first shelf 152. In one implementation, cylinder 114 is moved leftward as illustrated in FIG. 7 into v-ring seal 148 and backing support 154. Backing support 154 is bolted to outer sleeve 140 and is pressed into the hub housing 102. When located in the circular track 156, the backing support 154 maintains the position of the v-ring 148 against the interior surface 150 of the flange portion 112. The v-ring seal 148 substantially excludes external contaminants, such as external fluids, oil, dirt, and debris from entering the compact rotary union assembly.

The backing support 154 includes a plurality of holes 156 each of which is configured to receive a connector 158. Each of the connectors 158 extends through the holes 156 and into threaded apertures 160 defined in the outer sleeve 140 as seen in FIG. 6. An air seal 162 is located between the backing support 154 and the inner sleeve 110 to provide an air seal for airflow that moves between the first port 46 and the second port 48. As the connectors 158 are tightened, the backing support is received in a recess 161 of the outer sleeve 140. The air seal 162, which is located in a first circular track 166 of the outer sleeve 140, provides a seal between the backing support 154 and the outer sleeve 140. Once the combined assembly of the backing support 154, the air seal 162 and the outer sleeve 140 has been completed, this combined assembly is positioned over the cylinder portion 114. In one implementation, the flange portion 112 is threaded onto spindle 108. A second air seal 168, substantially similar to the first air seal 162, is located in a second circular track 170. As seen in FIG. 7, the first air seal 162 is located on a first side of the second port 48 and the second air seal 168 is located on a second side of the second port 48.

To ensure a continuous flow path for air transfer between the first port 46 and the second port 48, the outer sleeve includes an air track 172 located between the first circular track 166 and the second circular track 170. The circular air track 172 includes an inner surface that is spaced from the sidewall 132 of the cylinder portion 114 to provide a gap therebetween for airflow. In this configuration, the third channel 130 does not need to be aligned with the second port 48 to provide airflow. While the outer sleeve 140 and the hub housing 102 are interfaced at the surfaces 141, the outer sleeve 140 rotates, i.e., floats, with respect to the inner sleeve 110. Sealing is provided at the three locations where the air seals 162 and 168 and the v-ring seal 148 are located at the interface between the inner sleeve 110 and outer sleeve 140. In addition, if there is relative motion between the inner sleeve 110 and outer sleeve 140, the air seals 162 and 168 and the v-ring seal 148 slide along the longitudinal axis 112 while maintaining the seal.

An oil seal 174 includes a circular track 176 configured to receive a spacer 178. The combined oil seal 164 and spacer 178 are located adjacently to an end 180 of the cylinder portion 114 and within an oil seal circular track 182 defined in the outer sleeve 140. The spacer 178 and oil seal 174 are located around or receive the spindle 108 next to the tapered roller bearing 106. A circular cavity 184 is located between the oil seal 174 and spacer 178, which is connected to a breather channel 186 having a breather outlet 188. A breather element 190 is configured to fit within the breather outlet 188 to release any air that escapes from the circular air track 172. The breather element 190 is formed of a porous material the enables the air in cavity 184 to escape. In this way, the air is released to the external environment and is not trapped within the cavity 184. Damage to the oil seal 174 is therefore substantially prevented since any air pressure buildup is released through the breather 190.

The compact rotary union assembly 38 is a modular assembly that fits in a narrow space, for instance as seen in FIG. 3. The yoke 30 includes parallel extending brackets 192, which are spaced apart by a distance, which is relatively narrow due to enable the individual 17 row units to be spaced appropriately for row spacing. Other number or row units are contemplated. To accommodate the spacing, the inner sleeve 110 includes the planar surface 126, which is generally parallel to the surface to attached bracket 192. The hub housing 102 and the outer sleeve 140 rotate with the tire 34 that is fixed to the hub housing 102 at a hub flange 194. The assembly of the hub housing 102 and outer sleeve 140 therefore rotate about the first and second bearings 104 and 106 as the tractor 14 pulls the implement 12. During this rotation, the inner housing 110 remains stationary due to it being coupled to the spindle 108. In addition, the oil seal 174, the first and second air seals 162, 168, and v-seal 148 are free to rotate to maintain the appropriate sealing.

Since the union assembly 38 is modular, the assembly 38 is easily accessible to provide repair or replacement of the assembly 38. Serviceability with respect to the internal components is therefore improved. Tire life is also enhanced since any repair or replacement can be completed more easily when a problem first arises.

The union assembly 38 provides ease of installation by reusing existing components (hub, bearings, spindle, and wheel arm plates) and by preserving simple access for serviceability. The multifunctional inner sleeve 110 reduces the space claim, allowing packaging all the components in a very narrow space without requiring any modifications to the implement 12. No elastomer O-rings are included in this assembly 38, which increases its reliability and functional life. The present union assembly 38 is not attached to the rim, but is instead attached to the hub casting which reduces damage and contamination due to its narrow profile.

Figure 8:
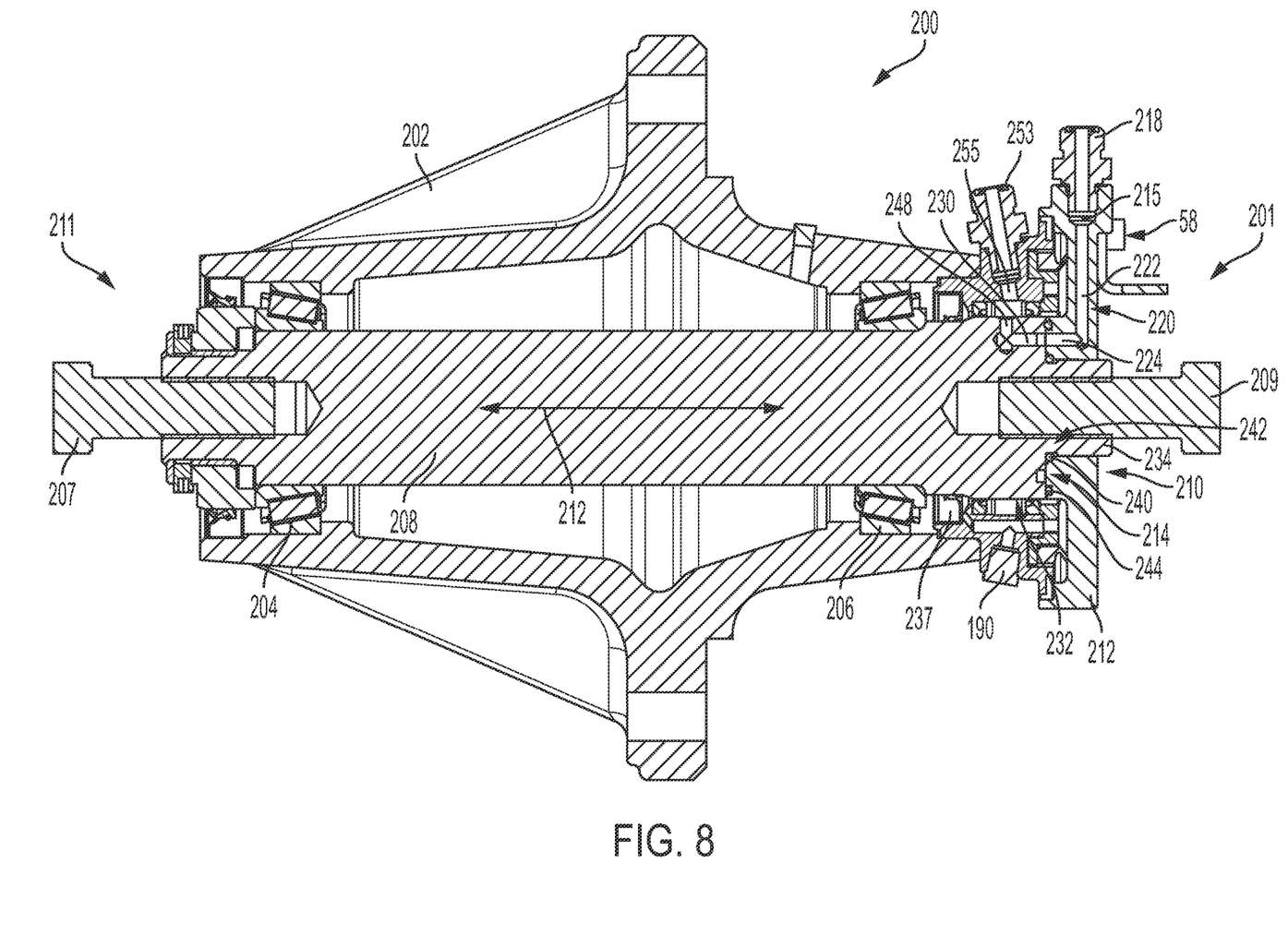
FIG. 8 illustrates a sectional view of another implementation of a wheel hub assembly including a compact rotary union assembly.

FIGS. 8-11 illustrate another implementation of a wheel hub assembly 200 to which a compact rotary union assembly 201 is coupled. As seen in FIG. 8, the hub assembly 200 includes a hub housing 202 defining an interior cavity supporting a first tapered roller bearing 204 and a second tapered roller bearing 206. Each of the bearings 204 and 206 rotatably support a spindle 208 within the housing 202. The spindle 208 includes a screw 209 that extends along a longitudinal axis 212 of the spindle 208. The spindle 208 is coupled to the yoke 30 to enable rotation of the wheel assembly 28. A second screw 207 extends from the hub housing 202 at an end 211 hub housing 202 and of the spindle 208, which is coupled to the yoke 30.

Figure 9:
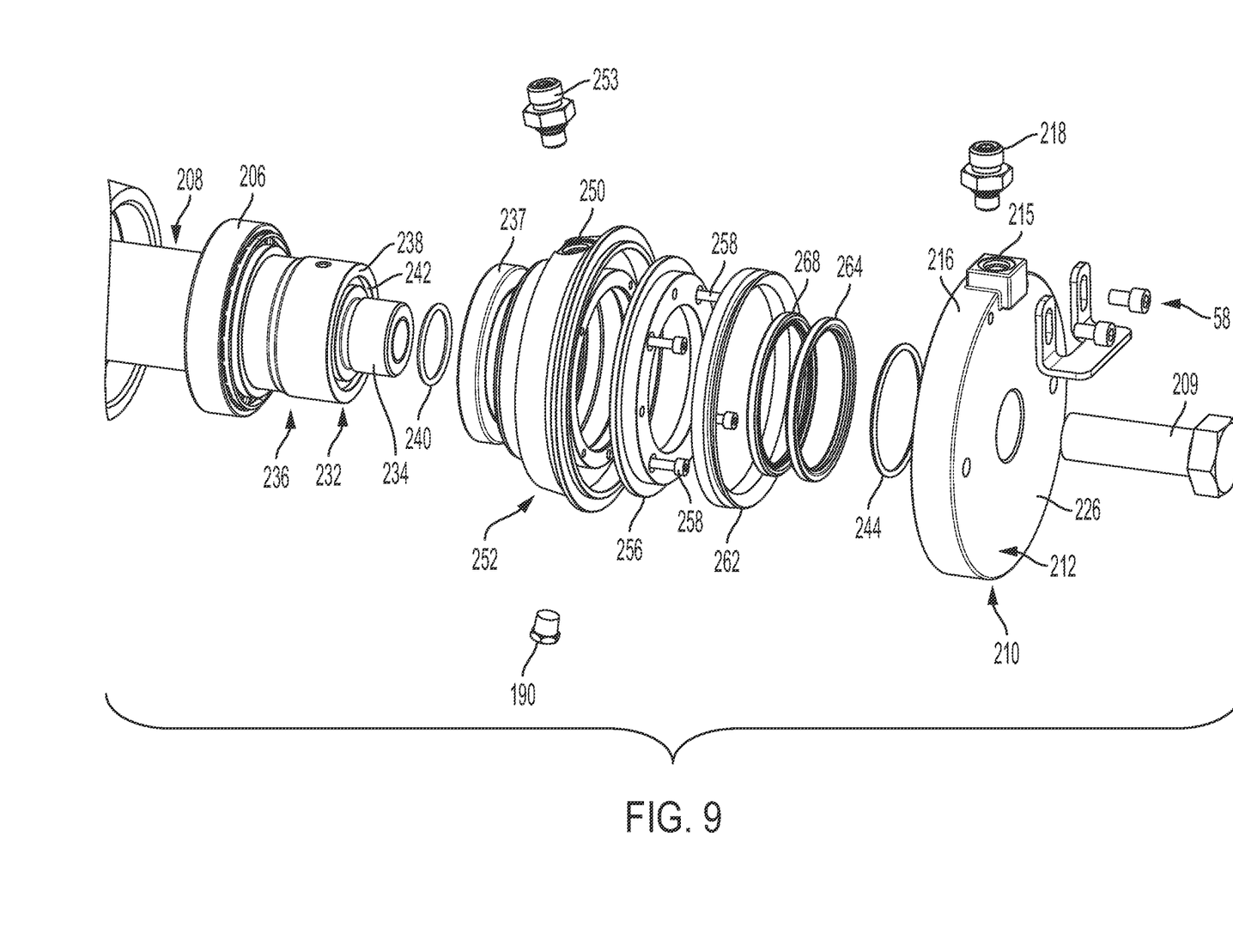
FIG. 9 illustrates a perspective exploded view of a compact rotary union assembly of FIG. 8.
Figure 10:
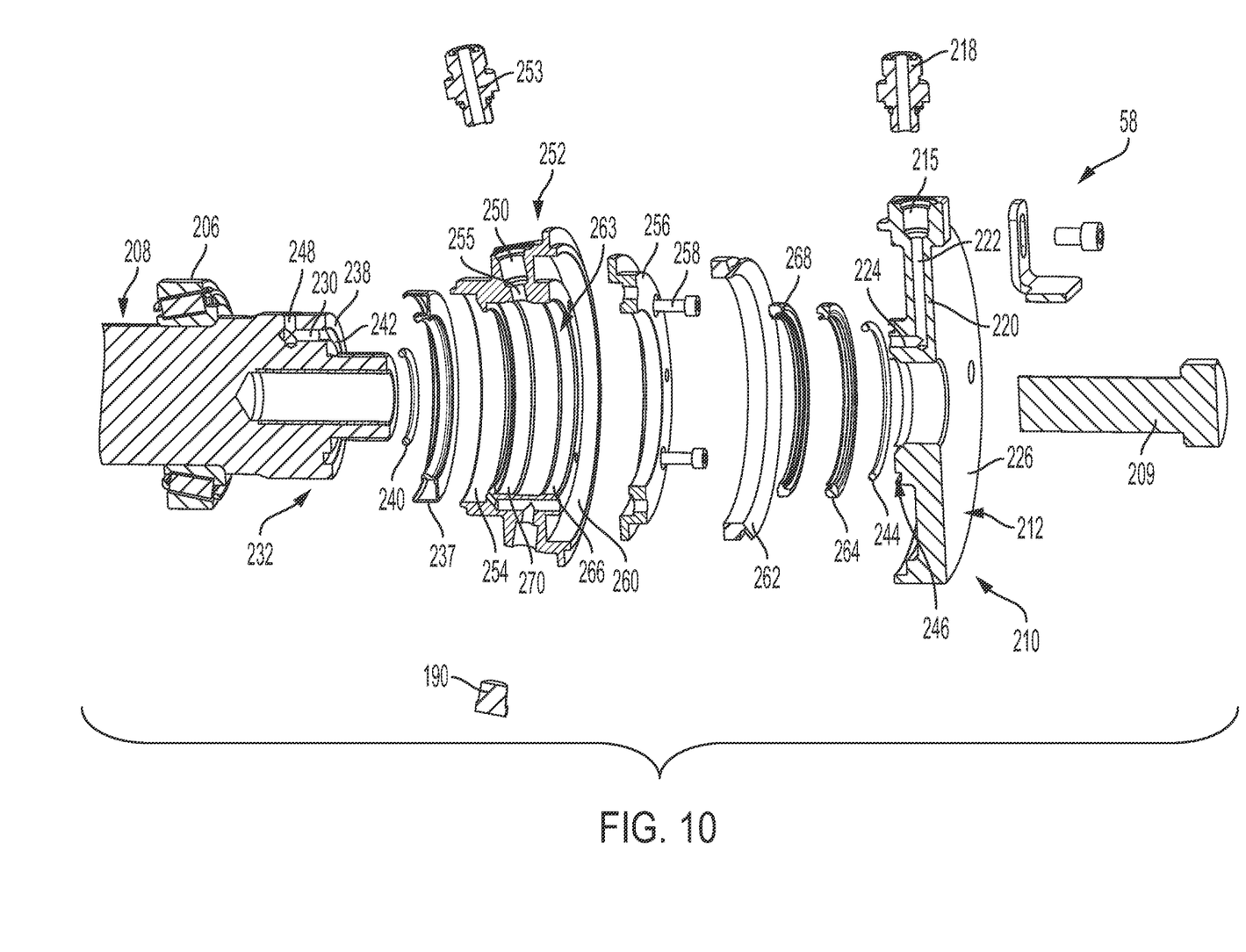
FIG. 10 illustrates a sectional exploded view of a compact rotary union assembly of FIG. 8.

The compact rotary union assembly 201 is further illustrated in a perspective exploded view of FIG. 9 and a sectional view of FIG. 10. The union assembly 201 includes an inner sleeve 210 having a flange portion 212 and a cylinder portion 214 connected to the flange portion 212.

A first port 215 is located at an outer circumference 216 of the flange portion 212 which is disk shaped. The outer circumference supports the first port 215. A first port connector 218 is configured to be received in the first port 215. The first air pipe 42 of FIG. 4 is connected to the first port connector 218.

The first port 215, as seen in FIG. 8, is connected to an inner sleeve channel 220 that includes a first channel 222 and a second channel 224. The first channel 222 generally extends along the flange portion 212 in parallel with a generally planar surface 226 of the flange portion 212. The second channel 224 is coupled to and extends from the first channel section 222 within the cylinder portion 214. In one implementation, each of the first channel 222 and the second channel 224 are gun-drilled passages. The machined pattern helps to exclude dust and debris from reaching the inside of the union 38. Other methods of forming the passages are contemplated, such as by casting. The second channel 224 extends to a third channel 230 located in an end portion 232 of the spindle 208.

The end portion 232 of the shaft 208 includes a first cylindrical portion 234 that extends through the flange portion 212 and a second cylindrical portion 236 having a face 238 that contacts the cylinder portion 214. When the shaft 208 is assembled to the inner sleeve 210, the face 238 contacts the cylinder portion 214 and the third channel 230 is fluidly coupled to the channel section 224 when properly aligned. To ensure a sealed interface between the shaft 208 and the inner sleeve 210, a first O-ring 240 is located at the interface of the face 238 and the cylinder portion 214. In one implementation, the first cylindrical portion 234 defines a track 242 configured to receive the first O-ring 240. A second O-ring 244 is located in a track 246 of the inner sleeve 210 to provide a seal at the interface between the face 238 and the cylinder portion 214. The first O-ring 240 and the second O-ring 244 provide a seal between the face 238 and the inner sleeve 210.

The third channel 230, located in the end portion 232, is coupled to a fourth channel 248, also located in the end portion 232. The fourth channel 248, in this implementation, extends generally perpendicular to the third channel 230. Other angles of inclination between the third channel 230 and the fourth channel 248 are contemplated. While the third channel 230 and the fourth channel 248 are described as being separate channels, connection of the third channel 230 to the fourth channel 248 provides a spindle channel that connects to and provide air flow from the first port connector 218 to a second port connector 253.

Airflow is directed from the first port 215, through the first channel 222, through the second channel 224, through the third channel 230, and through the fourth channel 248 where it connects to a second port 250 of an outer sleeve 252. The fourth channel 248 connects to an outer sleeve channel 255 formed in the outer sleeve 252 which connects to the second port 250. The second port connector 253 is connected to the second port 250. As seen in FIG. 10, the third channel 230 circumscribes the face 238 of the cylindrical portion 232. An oil seal 237 is located within a channel 254 of the outer sleeve 252. A backing support 256 is coupled to the outer sleeve 252 with connectors 258 within a channel 260. A V-ring seal 262 is located adjacently to the backing support 256 on one side of the seal 262 and a second side of the seal 262 is located adjacently to the inner sleeve 210. In this implementation, the spindle 208 includes a roughness surface in contact with the outer sleeve 252, which does not include a roughness surface. In other implementations, both the spindle 208 and the outer sleeve 252 include a roughened surface wherein each meet to seal cavities.

As further seen in FIG. 10, the outer seal 252 defines an outer seal bore 263 that extends through the outer seal 252. The outer seal bore 263 supports an air seal 264, which is located in a first circular track 266 of the outer sleeve bore 263, to provide a seal between the backing support 256 and the outer sleeve 252. Once the combined assembly of the backing support 256, the air seal 264, and the outer sleeve 252 has been completed, this combined assembly is positioned over the second cylindrical portion 236. A second air seal 268, substantially similar to the first air seal 264, is located in a second circular track 270. While not shown in FIG. 10, the first air seal 264 is located on a first side of the second port 250 and the second air seal 268 is located on a second side of the second port 48.

Figure 11:
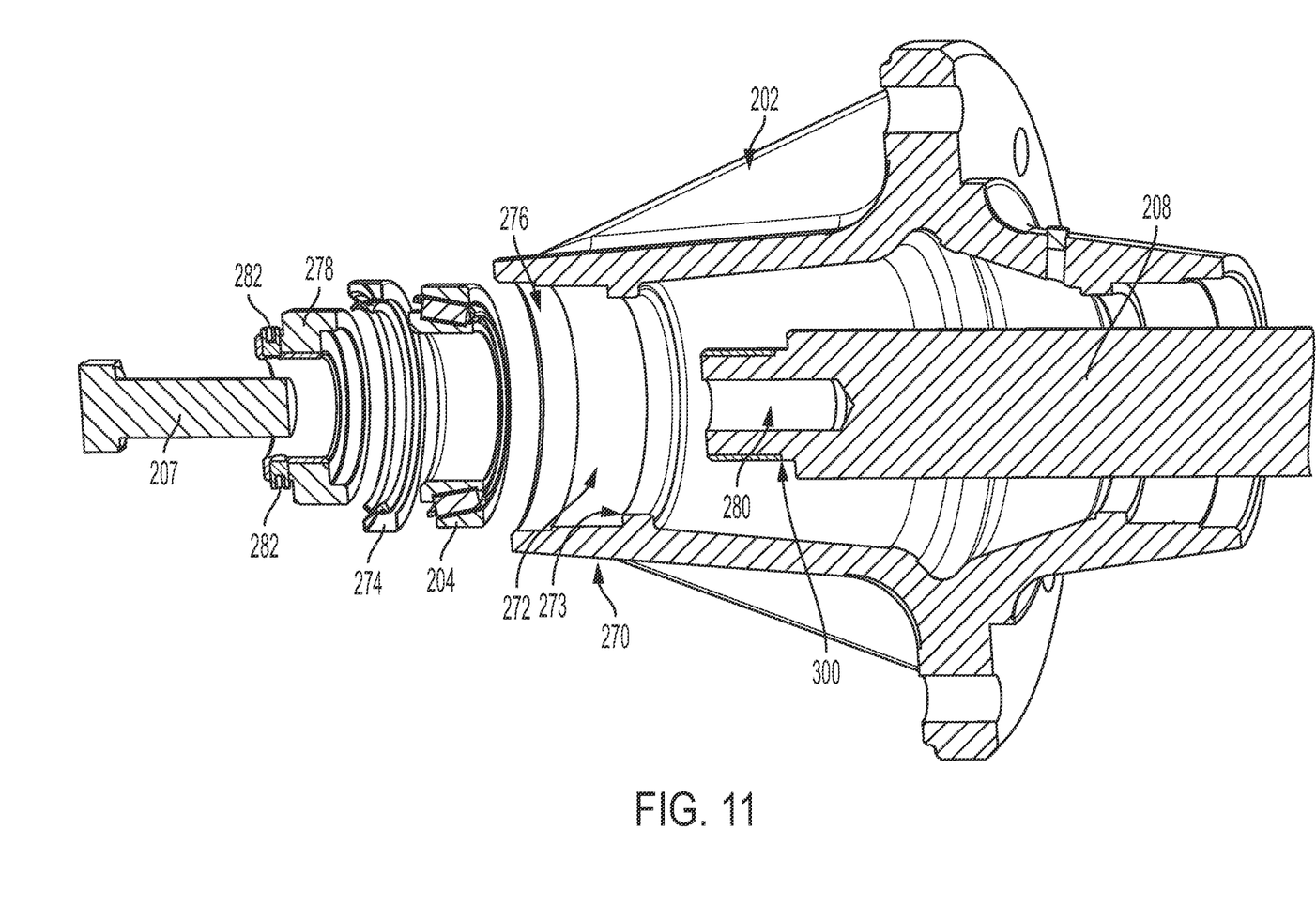
FIG. 11 illustrates a sectional exploded view of an end of the wheel hub assembly.

FIG. 11 illustrates an exploded view of the end 211 of the hub housing 202 and of the spindle 208. The bearings 204 fit within an end 270 of the housing 202 at a first cylindrical cavity 272. The bearings 204 are located adjacently to a step 273 formed in the housing 202. In other implementations, the step 273 is formed separately in another part instead of being integrated into the housing 202. Once inserted, a seal 274 is placed next to the bearings 204 in a second cylindrical cavity 276. The seal 274 is retained by and held by an interference fit with the hub housing on the track 276. The bearings 204 and substantially the spindle 208 are held in place by a hex nut 278. The hex nut 278 has a cylindrical portion on top of which a lip of the seal 274 is located. The second screw 207 is inserted through the hex nut 278, the seal 274, and the bearings 204. An end of the second screw 207 is further inserted into a cylindrical cavity 280 of the spindle 208. The cylindrical cavity 280 includes threads that engage threads of the second screw 207. Once threaded, the bearings 204 are held in place with the hex nut 278, which also serves as a track for the seal 274. Connectors 282, such as screws, extend through the hex nut 278 and engage a spindle cylindrical portion 300 to hold the hex nut 278 and the bearings 204 within the housing 202.

While exemplary implementations incorporating the principles of the present disclosure have been described hereinabove, the present disclosure is not limited to the described implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A compact rotary union assembly for inflating a tire mounted to a hub having a hub housing, comprising:
  an inner sleeve including a flange portion, a cylinder portion coupled to the flange portion, a bore extending through the flange portion and the cylinder portion, and a channel coupled to a first port, the channel extending through the inner sleeve, the channel including a first channel section extending through the flange portion and substantially parallel to a first planar surface of the flange portion, and a second channel section, coupled to the first channel section, the second channel section extending substantially parallel to the bore, wherein the second channel section is connected to the first channel section;
  an outer sleeve including an outer sleeve bore and a second port, wherein the inner sleeve is located within the outer sleeve bore and the second port is coupled to the second channel section; and
  a v-ring seal located between the inner sleeve and the outer sleeve, wherein the v-ring seal seals an interface between the inner sleeve and the outer sleeve to substantially prevent dust or debris from entering the compact rotary union.

2. The compact rotary union assembly of claim 1 wherein the outer sleeve includes a first air seal track spaced from a second air seal track to define an air track, wherein the air track is coupled to the second port and receives a flow of air from the second channel section.

3. The compact rotary union assembly of claim 2 wherein the outer sleeve includes a recess configured to receive a backing support, wherein the backing support is disposed in the recess and is adjacent to the v-ring seal.

4. The compact rotary union assembly of claim 3 wherein a first air seal is located in the first air seal track and the backing support holds the v-ring seal at the inner sleeve and holds the first air seal in the first air seal track.

5. The compact rotary union assembly of claim 4 further comprising a second air seal disposed in the second air seal track.

6. The compact rotary union assembly of claim 5 wherein the outer sleeve includes an oil seal circular track.

7. The compact rotary union assembly of claim 6 further comprising an oil seal and a step, wherein the step is located adjacently to the oil seal and the oil seal is located within the oil seal circular track.

8. The compact rotary union assembly of claim 1 wherein the bore defines a threaded surface along one or both of the flange portion and the cylinder portion, the threaded surface configured to engage a threaded surface of a spindle extending through the hub housing.

9. The compact rotary union assembly of claim 8 wherein the outer sleeve includes an interference surface to engage an interference surface of the hub housing, wherein the outer sleeve engages the hub housing with an interference fit.

10. The compact rotary union assembly of claim 9 further comprising a first air seal, a second air seal, and an oil seal, wherein the first air seal is located on a first side of the second port within the outer sleeve and the second air seal is located on a second side of the second port within the outer sleeve, and the oil seal is located adjacent to the first air seal to prevent leakage.

11. The compact rotary union assembly of claim 10 wherein the first air seal, the second air seal and the oil seal are free to rotate with respect to the inner sleeve.

12. The compact rotary union assembly of claim 11 wherein the v-ring seal is located between the second air seal and the flange portion.

13. The compact rotary union assembly of claim 1 comprises a retrofittable modular assembly for insertion into the hub housing.

14. A method of assembling a retrofittable compact rotary union assembly for insertion into a hub housing of a wheel assembly for a work vehicle comprising:
  providing a compact rotary union inner sleeve having a flange portion and a cylinder portion, both of which define a bore and a channel extending from a first port located at the flange portion to a second port located at the cylinder portion;
  inserting the cylinder portion into a v-ring seal until the v-ring seal contacts the flange portion;
  providing a compact rotary union outer sleeve having an outer sleeve bore defining a first circular seal track and a second circular seal track spaced apart by a circular air track connected to a second port;
  inserting a first air seal in the first circular seal track;
  inserting a second air seal in the second circular seal track;
  inserting the cylinder portion into the outer sleeve bore;
  aligning the circular air track with the second port of the cylinder portion; and
  inserting an oil seal into an oil seal track of the outer sleeve.

15. The method of claim 14 wherein the inserting the first air seal includes inserting the first air seal directly adjacent to one side of the circular air track.

16. The method of claim 15 wherein the inserting the second air seal includes inserting the second air seal directly adjacent to another side of the circular air track.

17. A hub assembly comprising:
  a hub housing defining a cavity;
  a spindle extending through and supported within the hub housing with a first roller bearing and a second roller bearing, wherein the spindle includes a spindle channel;
  an inner sleeve includes a flange portion, a cylinder portion coupled to the flange portion and coupled to the spindle, a bore extending through the flange portion and the cylinder portion, and an inner sleeve channel coupled to the spindle channel and coupled to a first port, the inner sleeve channel extending through the inner sleeve;
  an outer sleeve including an outer sleeve bore and a second port, wherein the inner sleeve is located within the outer sleeve bore and the second port is coupled to the to the spindle channel; and
  a v-ring seal located between the inner sleeve and the outer sleeve, wherein the v-ring seal seals an interface between the inner sleeve and the outer sleeve to substantially prevent dust or debris from entering the compact rotary union.

18. The hub assembly of claim 17 wherein the bore defines a threaded surface along one or both of the flange portion and the cylinder portion, the threaded surface configured to engage a threaded surface of the spindle.

19. The hub assembly of claim 18 wherein the outer sleeve includes an interference surface to engage an interference surface of the hub housing, wherein the outer sleeve engages the hub housing with an interference fit.

20. The hub assembly of claim 19 wherein the outer sleeve includes a first air seal track spaced from a second air seal track to define an air track, wherein the air track is coupled to the second port and receives a flow of air from the spindle channel.

\* \* \* \* \*